T. A. HOOVER.
BUMPER FOR VEHICLES.
APPLICATION FILED APR. 29, 1914.
1,105,974.
Patented Aug. 4, 1914.
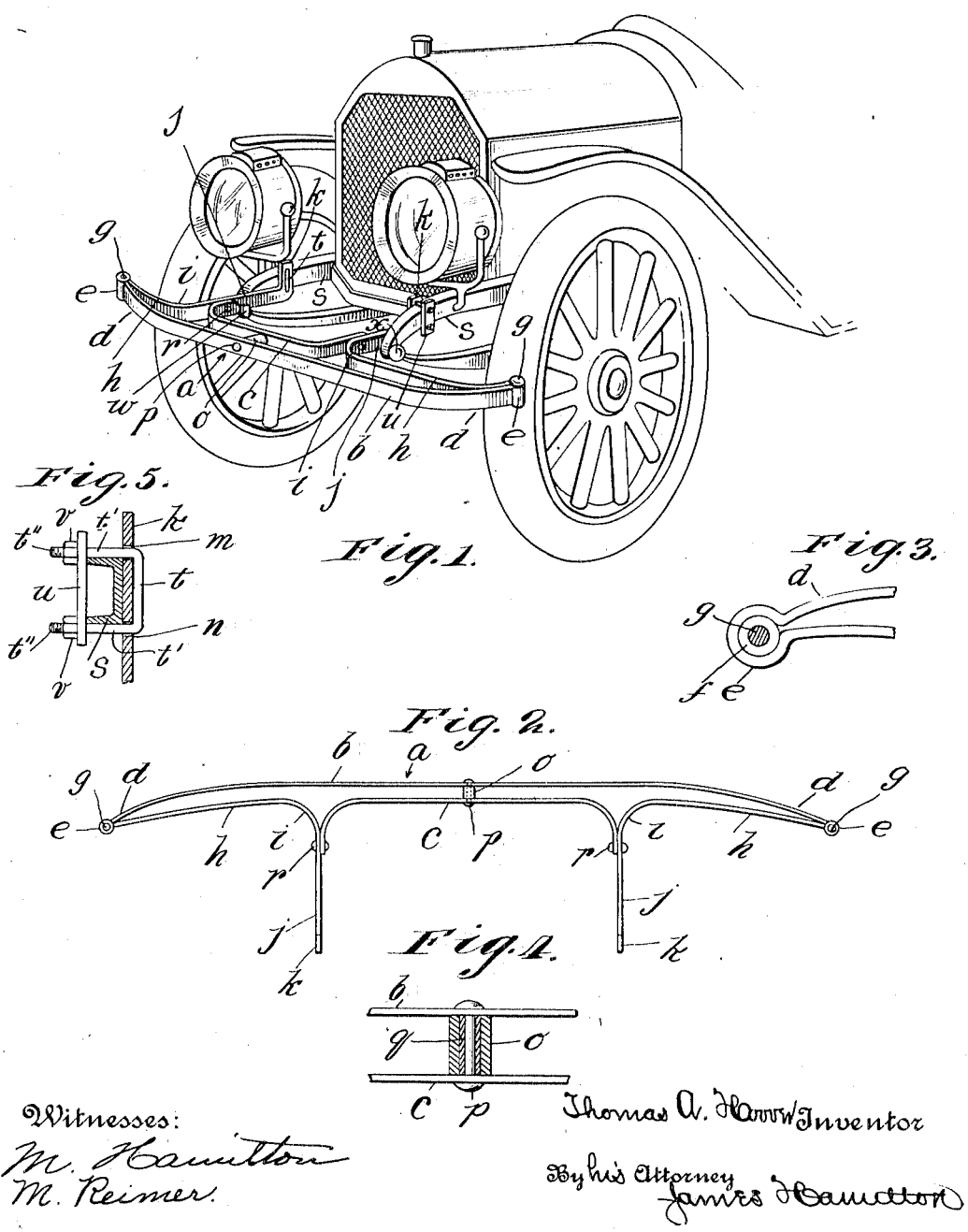

UNITED STATES PATENT OFFICE.

THOMAS A. HOOVER, OF FRESNO, CALIFORNIA.

BUMPER FOR VEHICLES.

1,105,974.   Specification of Letters Patent.   Patented Aug. 4, 1914.

Application filed April 29, 1914. Serial No. 835,099.

*To all whom it may concern:*

Be it known that I, THOMAS A. HOOVER, a citizen of the United States of America, residing at Fresno, in the county of Fresno and State of California, have invented certain new and useful Improvements in Bumpers for Vehicles, of which the following is a specification, reference being had to the accompanying drawings.

This invention relates to improvements in bumpers or fenders for automobiles, motor-vehicles and like self-propelled vehicles; and an object of this invention is to provide a bumper or fender which will be simple in construction, cheap in manufacture, efficient and durable in operation and use and yielding in nearly every direction from which a jarring force or shock may reasonably be expected to act upon the same.

Another object of this invention is to provide a bumper which will be symmetrical in outline and proportion and which will be susceptible of being nickel-plated or brass-plated.

In the drawings illustrating the principle of this invention and the best mode now known to me of applying that principle, Figure 1 is a perspective view of the front part of an automobile and shows the same fitted with one of my new bumpers; Fig. 2 is a plan view of one of the latter; Fig. 3 is a detail of the eye at each end of bumper; Fig. 4 is a detail in section of the separating sleeve washer; and Fig. 5 is a detail of the fastening clip.

The bumper *a* shown in the drawings consists essentially of two bars *b* and *c* shaped and fastened together as hereinafter described. The first part or bar *b* is made from a strip of spring-steel approximately one and three-quarters inches ($1\frac{3}{4}''$) wide and five-sixteenths of an inch ($\frac{5}{16}''$) thick and forms the main part of the bumper, giving to the same its shape or outline. At each end this main part curves at *d* toward the automobile (or rearwardly) and then laps or doubles back upon itself, forming at each extremity or tip-end an eye *e* in which is fitted a bushing *f* through which passes a rivet *g*. The doubled-back portion *h* at each end of the bumper extends inwardly in the same general direction as that of the adjacent part *d* of the main bar for a distance of about sixteen inches ($16''$), curving or sweeping gradually away from latter. The bar is next bent or turned at *i* toward the automobile (or rearwardly) and extends at substantially a right angle to form an arm *j* by means of which the bumper is attached to the automobile. The end *k* of the arm *j* is bent upwardly and formed with two holes *m*, *n*, adapted to receive the fastening devices. The second bar *c* is inserted between the rearwardly-extending arms *j* and extends substantially parallel to the main bar *b* for the greater part of its length. The two bars *b*, *c*, are spaced apart by a tubular or sleeve washer *o* about one and one-quarter ($1\frac{1}{4}''$) inches long and are fastened together by a rivet *p* which passes through the washer *o*. This washer *o* is preferably about centrally disposed with respect to the length of the bars *b*, *c*, and is preferably lined with rubber or wood lining *q*. Each end of the inner bar *c* curves rearwardly and is fastened (as by a rivet *r*) to the adjacent rearwardly-extending arm *j*; and by the rivets *p*, *r*, the two bars *b*, *c*, are firmly fastened together so as to constitute a single piece in reality.

The fender or bumper *a* is of sufficient length to protect or guard the front of an automobile or about sixty inches ($60''$) long and is attached to the machine, which it is designed to safeguard, in the following manner: The arms *j* are slipped inwardly between the channel irons *s* forming the front end of the frame or chassis of the car. The interval between the holes *m*, *n*, formed in the turned-up ends *k* of the arms *j* is sufficiently great to receive the front end of the channel iron *s*. To fasten the arm *j* to the latter, the legs *t'* of a U-shaped clip *t* are passed through the holes *m*, *n*, of the turned-up end *k* and through corresponding holes in a washer-plate *u* on the outside of the channel-iron *s*, and then nuts *v* are screwed on the projecting threaded ends *t''* of the legs *t'*, thereby binding the end *k* of the arm *j* firmly to the channel-iron *s*. By this construction, the boring of holes in the channel-irons of the chassis of the car is avoided. A supporting ear or lug *w* may be used at the spring-eye *x* at the end of the channel-iron *s* to give the arm *j* further support, if desired.

The bumper hereinbefore described combines, by virtue of the arrangement, distribution and formation of its component parts, the maximum strength of resistance that it is practicable to attain with the minimum weight of spring steel (the bumper weighing about eighteen pounds complete). The rearwardly-extending arms *j* of the metal strip *b*, which forms the outer bar, follow along the channel-irons *s* of the chassis of the car and, since these arms are united firmly to the channel-irons, great rigidity is given to the bumper, the channel-irons giving real assistance in strengthening and bracing the bumper. The bumper is preferably made of spring steel having the natural crucible steel temper; and, being made of this material, it will yield to all necessary bending or flexing forces and will bend in almost any shape without permanent deformation and, in this respect, differs from bumpers made of tubes, channel-iron or solid bars. It will yield sensitively from any point of impact and to any pressure directed upon it. The smoothness of the steel used furnishes a perfect surface for the taking of a plating of nickel or brass.

My new bumper is easy to make, is composed of few parts and can be manufactured cheaply and will not rattle.

I claim:

1. An automobile bumper consisting of a single continuous strip of spring metal the body portion of which is substantially convex outwardly and sufficiently wide to span substantially the front end of the automobile and the end-portions of which are curved first rearwardly and then extend inwardly; a pair of arms which project rearwardly from said inwardly-extending end-portions and which are spaced apart a distance sufficient to engage the side members of the automobile frame and are formed with means for attachment thereto; and a supplementary bar which lies in rear of and substantially parallel to said body portion and the ends of which are connected to said inwardly-extending end-portions.

2. An automobile bumper consisting of a single continuous strip of spring metal the body portion of which is substantially convex outwardly and sufficiently wide to span substantially the front end of the automobile and the end-portions of which are curved first rearwardly and then extend inwardly; a pair of arms which project rearwardly from said inwardly-extending end-portions and which are spaced apart a distance sufficient to engage the side-members of the automobile frame and are formed with means for attachment thereto; a supplementary bar which lies in rear of and substantially parallel to said body portion and the ends of which are connected to said inwardly-extending end-portions; and a spacing washer interposed between said body-portion and supplementary bar.

Signed at said Fresno, this 17th day of April, A. D. 1914, in the presence of the two undersigned witnesses.

THOMAS A. HOOVER.

Witnesses:
F. T. COOK,
H. T. KIRCH.

---

Copies of this patent may be obtained for five cents each, by addressing the "Commissioner of Patents, Washington, D. C."